W. R. WHITNEY.
ELECTRIC METER.
APPLICATION FILED MAR. 16, 1907.
925,064.
Patented June 15, 1909.
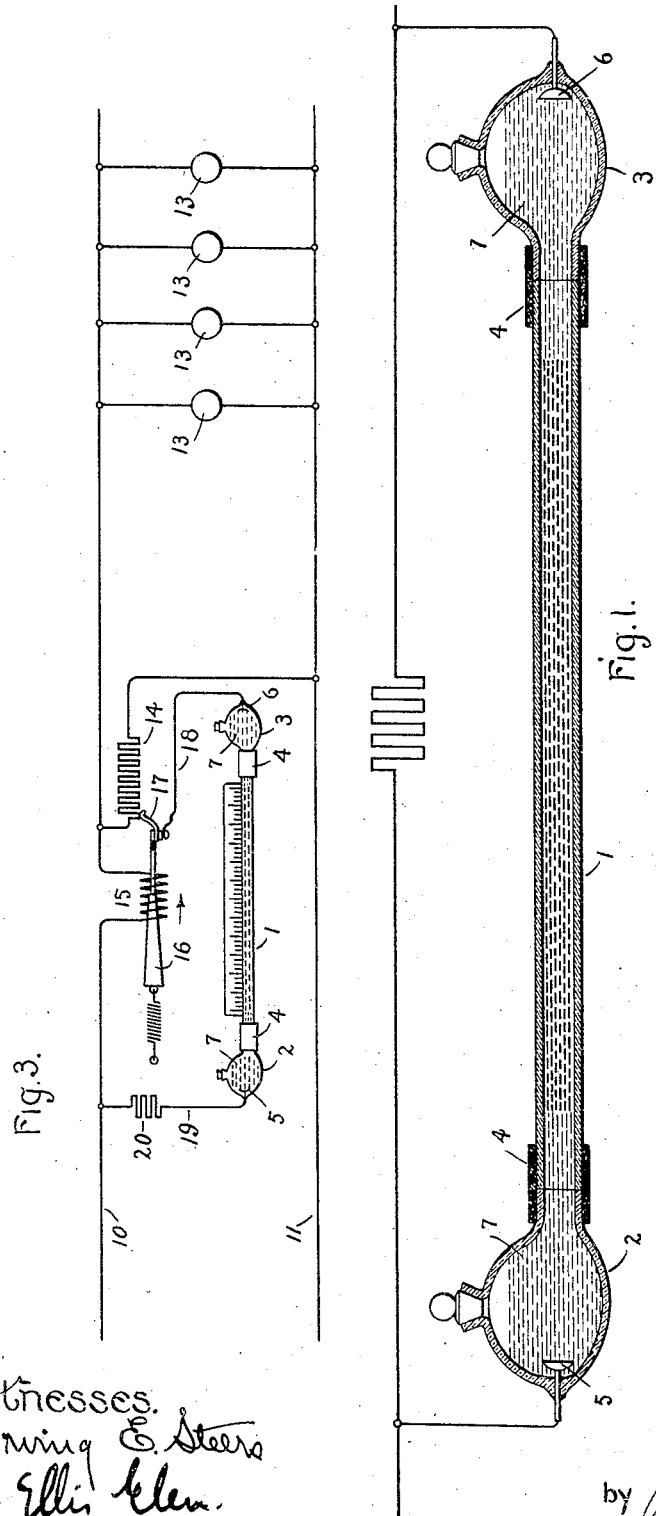
Witnesses.
Irving E. Steers
J Ellis Glen
Inventor.
Willis R. Whitney.
by Albert G. Davis
Att'y

UNITED STATES PATENT OFFICE.

WILLIS R. WHITNEY, OF SCHENECTADY, NEW YORK, ASSIGNOR TO GENERAL ELECTRIC COMPANY, A CORPORATION OF NEW YORK.

ELECTRIC METER.

No. 925,064.    Specification of Letters Patent.    Patented June 15, 1909.

Application filed March 16, 1907. Serial No. 362,615.

*To all whom it may concern:*

Be it known that I, WILLIS R. WHITNEY, a citizen of the United States, residing at Schenectady, county of Schenectady, State of New York, have invented certain new and useful Improvements in Electric Meters, of which the following is a specification.

My invention relates to a method of and apparatus for measuring electricity, and in carrying out my invention I measure the migration of ions through an electrolyte, this migration being proportional to the difference in potential between the electrodes. By choosing the proper electrolyte, the ions will react therewith and indicate their presence, preferably by causing visible changes, such as a change of color in the electrolyte; or, if desired, some indicator or indicating medium affected by the presence of ions may be placed in the electrolyte, and the extent of change produced in the electrolyte is a measure of the migration of the ions.

My invention will best be understood by reference to the accompanying drawing, showing one embodiment thereof, in which—

Figure 1 shows one form of meter made in accordance with my invention; Fig. 2 is a detail of the meter; and Fig. 3 is a system of connections which makes the device a watt-meter.

In the form of meter shown in the drawing a metering tube 1 of glass or other transparent material has receptacles 2 and 3 connected to each end of it by means of rubber or other suitable connectors 4, forming a liquid-tight joint between the receptacles and the tube 1. The receptacles contain electrodes 5 and 6, connected to the terminals of the meter which in turn are connected to the main conductor, one on each side of a resistance in series with the main conductor, as shown in Fig. 1, and each receptacle preferably contains a liquid 7, which furnishes the ions which are to be migrated. A liquid which may be used for this purpose is a one tenth of one per cent. solution of copper sulfate. The electrolyte affected by the ions is contained in the indicating tube 1 and is preferably partially solidified by means of gelatin or other viscous material, or by sand or similar material so as to prevent convection and stirring. The electrolyte in the metering-tube is affected or changed in color, by the presence of the ions, which are caused to migrate through it by the difference of potential between the electrodes 5 and 6. As the ions enter the electrolyte in the metering-tube, they react therewith and cause a visible effect such as a change in color, and the result is that there is a sharp line of demarcation between that portion of the electrolyte affected by the ions and that portion which remains unaffected. This line gradually moves from one electrode toward the other, its progress being a true measure of the currents which have passed through the meter. A scale of convenient form is mounted adjacent the metering-tube so that the movement of the indicating line may be readily followed.

When the liquid 7 surrounding the electrodes 5 and 6 is copper sulfate solution, copper ions are migrated, and a suitable substance for the metering-tube 1 is zinc sulfid jelly, made of 10% to 30% gelatin, to which has been added zinc sulfate and the theoretical amount of sodium sulfid to form zinc sulfid. As the copper ions migrate into the zinc sulfid jelly, brown copper sulfid is formed, filling the tube from side to side and gradually extending along the tube as the current continues to flow, the line between the copper sulfid and the zinc sulfid being always well defined. The position of this line in relation to the scale indicates the amount of current which has passed through the meter.

The ions may indicate their presence by affecting the electrolyte in the indicating tube by causing a change in color which is the effect most easily observed and followed, and is, therefore, the effect most desirable in practice. The indicating effect in the metering-tube may be obtained by mingling any desired indicator with the electrolyte in the metering-tube, so that any desired change of color may be obtained. The apparent rate of migration of the indicating line may also be altered by placing in the metering-tube a substance which will react with and remove the ions from the indicating medium without giving any indication of the presence of said ions. If an acid ion is being migrated, an alkaline reagent in the metering-tube will react with the acid ion before it can affect an indicating medium. If, for instance, chalk and an indicating medium are uniformly distributed throughout the metering-tube and remain so on account of the gelatin or other viscous material in the tube, the net result is that the movement of the indicating line through the metering-tube is much slower than it would be if the chalk were not present; since as the acid ions are migrated into the mixture, they will react with any chalk they encounter without giving any indication of such reaction until the chalk is completely used up; after which the following ions will react with the indicating medium, and will give a visible indication of their presence. The movement of the indicating line is the same, except for speed, as it would be if the chalk were not present. It is obvious that the rate of diffusion between the liquid around the electrodes 5 and 6 and that in the metering-tube 1 may be made constant by maintaining the temperature of the meter constant in any desired way, such, for example, as by using the principle shown in Patent No. 251,558, Edison, Dec. 27, 1881. I may also use any other desirable means for controlling the rate of diffusion of the liquids. I may also prevent the diffusion of the liquids but permit the migration of the ions, and one of the ways in which I may obtain this result is shown in Fig. 2, in which the metering-tube is drawn down to a fine opening 9. This opening is of such a size that it practically prevents all diffusion of the liquids but permits the passage of ions into the metering-tube 1. Many other means of obtaining this result may be employed, and I do not desire to be restricted to the specific embodiment shown and described.

An arrangement causing a meter made according to my invention to act as a watt-meter is shown in Fig. 3, in which 10 and 11 are the leads of the circuit supplying lamps or other translating devices 13. A resistance 14 is connected across between the leads 10 and 11, and a solenoid 15, in series with the lead 10, is provided with a spring-retracted core 16, which carries at one end a contact-brush 17 sliding lengthwise of and engaging with the resistance 14. The lead 18 connects the brush 17 to one terminal of the meter, the other terminal being connected to the lead 10 through a lead 19 and a balancing resistance 20, the resistance of which increases with rise of temperature at the same rate as the resistance of the meter decreases with the same rise of temperature. As the current in the lead 10 increases, the core 16 is moved to the right, in the direction of the arrow, and the movement of the brush 17 over the resistance 14 reduces the amount of said resistance in series with the meter, thereby increasing the difference of potential between the leads 18 and 19 connected to the terminals of the meter.

My invention may be embodied in many other forms than that shown and described, and I, therefore, do not desire to be limited to the exact form shown herein, but intend to cover by the claims all changes and modifications which are fairly within the spirit and scope of my invention.

What I claim as new and desire to secure by Letters Patent of the United States, is,—

1. The method of measuring an electric current which consists in causing ions to migrate through an electrolyte at a rate proportional to the current and to react with said electrolyte to produce permanent changes in color and thereby show the rate of migration.

2. The method of measuring an electric current which consists in causing ions to migrate at a rate proportional to the current through an electrolyte reacting with part of the ions to produce a permanent visible change and in neutralizing part of the ions without indicating their presence thereby lessening the apparent rate of migration.

3. The method of measuring an electric current which consists in causing ions to migrate at a rate proportional to the current through an electrolyte composed of two fluids, each indicating by permanent changes in color the presence of ions from the other and in controlling the diffusion of said fluids.

4. In an electric meter, the combination with a vessel containing an electrolyte permanently changed in appearance by reaction with ions, of a source of electromotive force connected to the terminals of said meter to cause ions to migrate through said electrolyte.

5. In an electric meter, the combination with a vessel containing an electrolyte permanently changed in color by the presence of ions, of a source of electromotive force connected to the terminals of said meter to cause ions to migrate through said electrolyte.

6. In an electric meter, the combination with a vessel containing an electrolyte permanently changed in appearance by ions, of a source of electromotive force connected to the terminals of the meter to cause ions to migrate through said electrolyte, and a material mixed with said electrolyte to neutralize the ions and thereby diminish the apparent rate of migration.

7. In an electric meter, the combination with a vessel containing two fluids, each reacting with ions from the other to produce permanent visible changes, of means for preventing diffusion of said fluids, and a source of electromotive force connected to the meter to cause ions to migrate from one fluid to the other.

8. In an electric meter, the combination with a vessel containing two fluids, each reacting with ions from the other to produce permanent visible changes, of a source of electromotive force connected to the terminals of the meter to cause ions to migrate from one fluid into the other, and means for preventing diffusion of said fluids while permitting the migration of the ions.

9. In an electric meter, the combination with a tube containing viscous material and two fluids, each fluid being an indicator for the presence of the ions from the other, of a source of electromotive force connected to the terminals of the meter to cause ions to migrate from one fluid into the other.

10. In a meter for electric circuits, the combination with a vessel containing an electrolyte and terminals immersed in said electrolyte, of a connection between one terminal and one of the leads of said circuit, a resistance connected across said circuit, a connection from the other terminal movable over said resistance, and automatic means responsive to current in said circuit for moving said connection over said resistance to make the difference of potential between said terminals dependent on the current and the voltage in said circuit.

In witness whereof, I have hereunto set my hand this 14th day of March, 1907.

WILLIS R. WHITNEY.

Witnesses:
BENJAMIN B. HULL,
HELEN ORFORD.